US012807468B2

(12) United States Patent
O'Neill

(10) Patent No.: US 12,807,468 B2
(45) Date of Patent: Nov. 24, 2026

(54) TWIST-OFF CROWN BOTTLE CAP REMOVAL DEVICE

(71) Applicant: Ronald Anthony O'Neill, Largo, FL (US)

(72) Inventor: Ronald Anthony O'Neill, Largo, FL (US)

( * ) Notice: Subject to any disclaimer, the term of this patent is extended or adjusted under 35 U.S.C. 154(b) by 334 days.

(21) Appl. No.: 18/539,903

(22) Filed: Dec. 14, 2023

(65) Prior Publication Data

US 2025/0197182 A1 Jun. 19, 2025

(51) Int. Cl.
*B67B 7/16* (2006.01)

(52) U.S. Cl.
CPC ..................................... *B67B 7/16* (2013.01)

(58) Field of Classification Search
CPC .................................... B67B 7/16; B67B 7/18
See application file for complete search history.

(56) References Cited

U.S. PATENT DOCUMENTS

| | | | | |
|---|---|---|---|---|
| 3,812,741 | A | 5/1974 | Heine | |
| 4,235,132 | A | 11/1980 | Kendall | |
| 4,337,678 | A | 7/1982 | Mumford | |
| 4,414,865 | A | 11/1983 | Brooks et al. | |
| 4,433,597 | A * | 2/1984 | Rowland | B67B 7/44 81/3.4 |
| D278,509 | S | 4/1985 | Middleton et al. | |
| D280,594 | S | 9/1985 | Dow | |
| 4,911,038 | A | 3/1990 | Ferrin | |
| 4,967,622 | A | 11/1990 | Phillips | |
| 4,979,407 | A | 12/1990 | Hernandez et al. | |
| 5,022,288 | A * | 6/1991 | Taktakian | B67B 7/18 81/3.4 |
| 6,098,497 | A | 8/2000 | Larose | |
| 6,105,468 | A | 8/2000 | Fohrman et al. | |
| D440,134 | S | 4/2001 | Brix-Hansen | |
| D462,000 | S | 8/2002 | Hightower | |
| 6,666,110 | B1 | 12/2003 | Buettner | |
| D497,088 | S | 10/2004 | Davis | |
| D519,010 | S | 4/2006 | Oas | |
| D568,127 | S | 5/2008 | Oas | |
| 8,720,714 | B2 | 5/2014 | Romero | |
| D781,119 | S | 3/2017 | Antonio | |
| D799,925 | S | 10/2017 | Wheeler et al. | |
| D957,221 | S | 7/2022 | Fina | |
| D957,905 | S | 7/2022 | Manak | |
| 2003/0061912 | A1 | 4/2003 | Battles et al. | |
| 2007/0079670 | A1 | 4/2007 | Chaconas et al. | |
| 2007/0204726 | A1 | 9/2007 | Burton et al. | |

(Continued)

*Primary Examiner* — Brian D Keller
*Assistant Examiner* — Aaron R McConnell

(57) ABSTRACT

A device to remove both 21 and/or 27 point twist-off crown bottle caps. It comprises 4 pieces, a main body, a backup disk, an art disk and a clear lens. It is cup shaped and is sufficient in diameter and thickness to accept the insertion of a twist off crown bottle caps. The interior circular wall is comprised of a single row of strategically placed vertical embossments (ribs) to accept the grooves of both 21 and/or 27 point twist-off crown bottle caps. The backup disk, art disk and clear lens are inserted in the top of the main body to complete the assembly and display the art work. The art disk can be removed and/or replaced if warranted. To use the device, place it over the cap, and with your hand, twist counter clockwise wise.

2 Claims, 3 Drawing Sheets

(56) References Cited

U.S. PATENT DOCUMENTS

| | | | |
|---|---|---|---|
| 2009/0145267 | A1 | 6/2009 | Moles |
| 2011/0220607 | A1 | 9/2011 | Mukunoki |
| 2013/0082023 | A1 | 4/2013 | Wand |
| 2013/0098210 | A1 | 4/2013 | Bartz |
| 2016/0318196 | A1 | 11/2016 | Reder |
| 2022/0098019 | A1 | 3/2022 | Bratta |
| 2023/0159239 | A1 | 5/2023 | Clore |

* cited by examiner

TWIST-OFF CROWN BOTTLE CAP REMOVAL DEVICE

FIELD OF THE INVENTION

The invention relates to a device to remove both 21 and/or 27 point twist-off crown bottle caps from a bottle and is so designed as to display art work through a clear transparent lens.

BACKGROUND OF THE INVENTION

A twist-off crown bottle cap is a device used to seal beverage bottles, most commonly used on beer bottles. The cap (closure) has a circumferential skirt around the lower edge comprised of a series of projecting flutes called jags (ribs or points). Invented by William Paint in 1892 the original crown cap had 24 jags. Eventually 21 jags became the standard and even more recently 27 point caps have become common place. The cap is firmly secured to the bottle to prevent leakage. As such, it can be difficult to remove and the sharp jags can cut the users hand when trying to remove it from the bottle. In response, numerous devices have been developed to help assist with the removal of these caps. Some removal devices have a top surface suitable to display art work for the purposes of advertising.

It is the intention of this devise to provide a unique twist-off crown bottle cap removal device that will remove both 21 and/or 27 point twist-off crown bottle caps by means of a single row of embossments strategically placed around the inner circular wall. Furthermore, a device that can protect the art work by means of a clear, transparent lens that can be removed and/or replaced by the owner if warranted.

In some prior art the number of ribs and grooves of a closure are matched with the grooves and ribs to the device, as with U.S. Pat. No. 4,337,678A claim 1. In this example, the placement of the ribs is described as having "a plurality of peripherally spaced vertically ribs on the inner surface of said circular wall respectively adapted to engage the vertical grooves of the closure". As such, the claim restricts the ribs to be respectively adapted to "the closure", a single closure but not multiple closures. Such a device, as illustrated in its prior art Drawings, FIG. 1, uses 7 ribs to engage a crown cap. A device, so designed, engages a 21 point cap but not a 27 point cap as illustrated in Drawings, FIGS. 8 and 9, of this document.

In U.S. Pat. No. 6,666,110B1 as stated in its claims 6 and 7 wherein it describes the number of the grooves (notches) to be "equal to the number of jags on said bottle cap" and "the number of notches is 21". The restriction of having an "equal" number of spaces, in of its self, defines the number of notches to match a single cap whether it be 21, 27 or any other number of notches. As such, the number can be one (21) or another (27) but not one and/or the other. In so much as the device is designed to engage a 21 point cap it will not engage a 27 point cap. The ribs and groves on the device and the ribs and grooves on a 27 point cap will result on a mismatch, as illustrated in FIGS. 10 and 11 of this application. Claim 7 further restricts the number of notches to be 21.

Further, U.S. Pat. No. 3,812,741 as stated in its Summary of Invention, describes a device to remove "more than one type of caps", like beer bottle caps and soda bottle caps. To accomplish this, a second rows of ribs and grooves are added to the inner circular wall.

In patent, U.S. Pat. No. 4,433,597 as stated in its Description of the Preferred Embodiment, example 9, "a transparent top member 12 of either glass or plastic is connected directly to the top wall 3 of the base member", the top member is permanently affixed to the base member making the art work permanently affixed to the device and not removable or replaceable.

SUMMARY OF THE INVENTION

The twist-off crown bottle cap removal device is a device to remove both 21 and/or 27 point twist-off, crown bottle caps off a bottle. It is cup shape and slightly larger in diameter and thickness to a twist-off crown bottle cap. The embodiment is comprised of four pieces, a main body, a backup disk, an art disk and a clear, transparent lens.

The body is a circular, cylindrical shape having a through hole with an inner circular wall and a single row of strategically placed embossments positioned vertically around a central axis. It comprises a groove on the top suitable in diameter, width and depth to accommodate the insertion of an inverted cup shaped lens. The outer wall is embossed with a polarity of equally spaced vertically ribs and grooves to facilitate a comfortable hand grip for twisting the device to facilitate the cap removal. The outer wall further comprises, a single embossment with a through hole to facilitate the insertion of a key ring. The body is comprised of a color but not limited to, blue, green, red, yellow, orange, purple, black and white or a combination of two or more color and constructed of a material, but not limited to, hard or soft molded plastic, aluminum and metal.

The device further comprises a clear transparent cup shape lens, suitable in size and shape, to allow for the insertion of the inverted lens into the top groove in the body. It is held in place by means of a friction fit between the walls of the groove in the body and the walls of the lens. The friction fit further facilitates the removal of the lens from the body for the purpose of replacing the art disk. The lens is constructed of a hard, clear, transparent material capable of protecting and viewing the art disk housed within.

The art disk comprises an image, such as, but not limited to, a photographic image, a painted image, a printed image, an engraved image, a drawn image or embossed image. It is suitable in size and shape, so as to allow for its encapsulation between the backup disk and lens such that the art is visible from the top through the clear transparent lens.

The backup disk is suitable in size and shape to the art disk and is capable of being inserted into the cup shaped lens to serve as a support mechanism for the art disk upon assembly.

The pieces are assembled by placing the art disk into the open end of the cup shaped lens with the art work facing down toward the bottom of the lens followed by the backup disk. The assembled pieces are then inverted and inserted into the groove in the top of the body.

The device further comprises a method to dissembled the device by applying finger pressure to the underside of the backup disk through the opening in the underside of the main body.

OBJECT OF THE INVENTION

The object of this device is to provide an apparatus to remove both 21 and/or 27 point twist-off crown bottle caps off a bottle. Some devices remove caps that comprise a specific number of ribs or grooves, others remove multiple caps but require more than a single row of ribs and grooves. This device differs in that it uses a single row of strategically placed vertical ribs to remove both 21 and/or 27 point crown caps.

It is a further object of this device to be simple to use. To use the device, hold it in your hand and manually place it over the top of a twist-off crown bottle cap and twist it counter clock wise, with sufficient force, to separate the cap from the bottle.

It is a further object of this device to be relatively inexpensive to produce. Plastic injection molded parts should facilitate this objective.

It is a further object of this device to display artwork. The art disk comprises artwork that is visible through the clear transparent lens.

It is a further object of this device to be able to remove and replace the artwork. It can be dissembled by applying finger pressure to the underside of the backup disk through the opening in the underside of the main body. This feature enables the user to replace the art work with something more desirable.

It is a further object of this device to be durable. When attached to keys, the art work is highly susceptible to damage. The clear transparent lens protects the art work.

It is a further object of this device to provide a safe means to remove a crown bottle cap from the bottle. Caps are firmly secured to bottles and possess sharp fags around the lower edge. As such, they can be difficult to remove and the sharp jags can cut the user's hand. This device provides a comfortable grip to help prevent cuts.

DETAILED DESCRIPTION OF THE DRAWINGS

Figure 1:
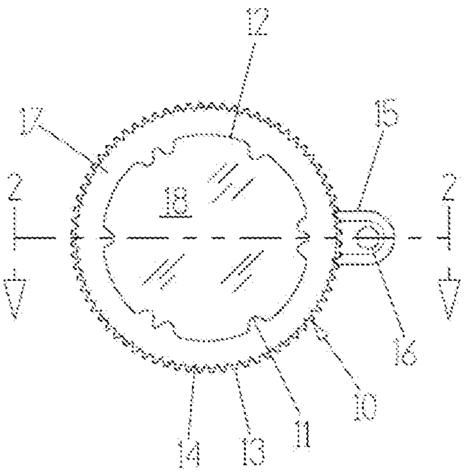
FIG. 1 Is a bottom view of the bottle cap remover.

FIG. 1 is a bottom view of the device 10. The main body 17 comprises a solid circular object having a central interior wall opening 12 to a surface depth defined by the position of the backup disk 18. The wall is embossed with strategically placed ribs 11 to engage with the grooves FIG. 5 #24 on a 21 point crown cap FIG. 5 #23, and/or the grooves FIG. 6 #26 on a 27 point crown cap FIG. 6 #25. The device comprises an outer circular wall embossed with a polarity of equally spaced vertically ribs 13 and grooves 14 to provide a comfortable hand grip for twisting said device to facilitate cap removal. The exterior wall also comprises a single embossment 15 with a through hole 16 to accommodate a key ring.

Figure 2:
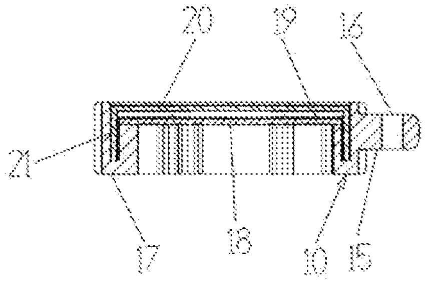
FIG. 2 Is a sectional view on the plain 2-2 FIG. 1.

FIG. 2 is a sectional view of device 10 through 2-2, FIG. 1. It shows crosshatching through the main body 17, backup disk 18, art disk 19 and the clear transparent lens 20. It further displays the circular groove 21 extending downward from the top depicting the location for the insertion of the lens 20 by means of a friction fit. It further comprises a single embossment 15 with a through hole 16 to accommodate a key ring.

Figure 3:
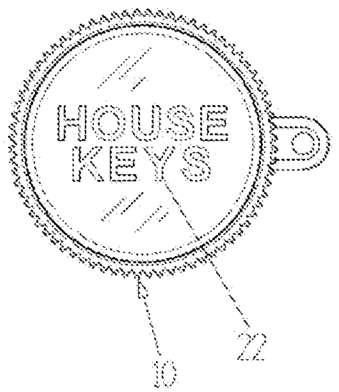
FIG. 3 Is a top view of the bottle cap remover.

FIG. 3 is a top view of the device 10 comprising the art work 22, illustrating "HOUSE KEYS" for display purposes only, on the art disk FIG. 2, #19, visible through the clear transparent lens FIG. 2, #20.

Figure 4:
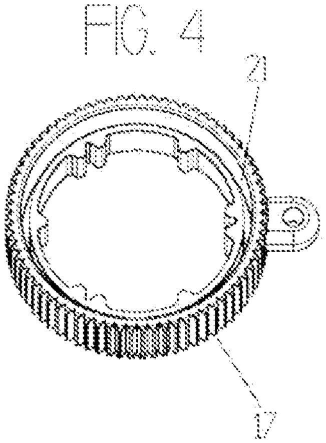
FIG. 4 Is a perspective view of the body from the top.

FIG. 4 is a perspective, top view comprising the main body 17 displaying the circular groove 21 that receives the clear lens FIG. 2, #19.

Figure 5:
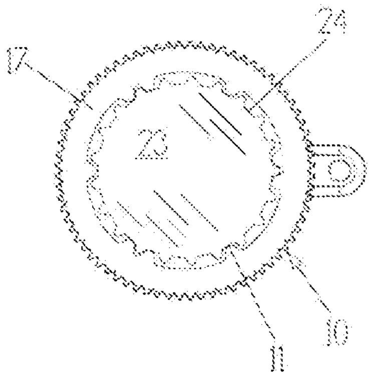
FIG. 5 Is a bottom view illustrating the compatibility of an inserted 21 point cap in the underside of the device.

FIG. 5 is a bottom view of device 10 comprising the main body 17 showing the engagement of the grooves 24 on a 21 point bottle cap 23 with corresponding ribs 11 on the main body 17.

Figure 6:
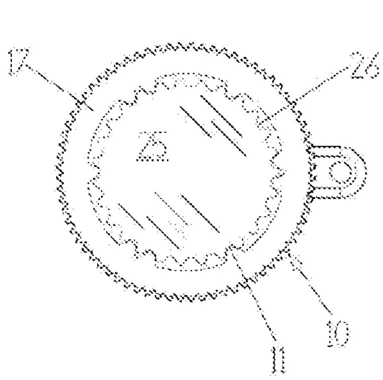
FIG. 6 Is a bottom view illustrating the compatibility of an inserted 27 point cap in the underside of the device.

FIG. 6 is a bottom view of device 10 comprising the main body 17 showing the engagement of the grooves 26 on a 27 point bottle cap 25 with corresponding ribs 11 on the main body 17.

Figure 7:
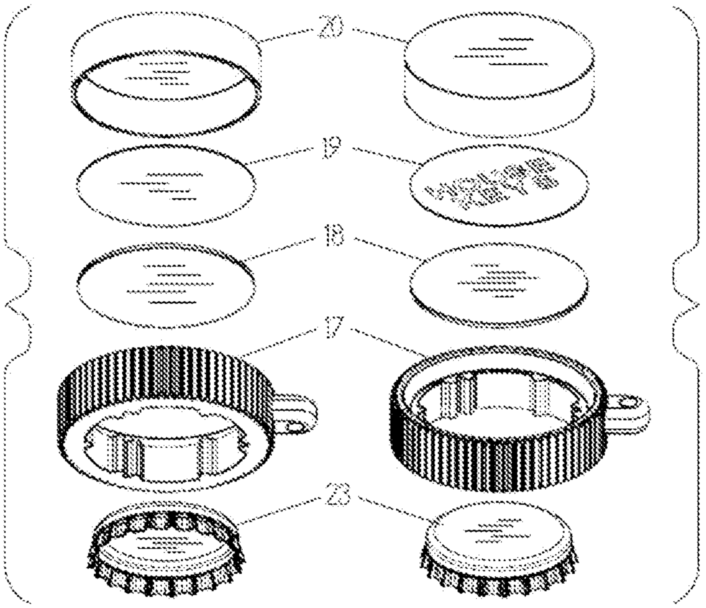
FIG. 7 Is 2 exploded, perspective view of the device and a 21 point cap from both the bottom and top.

FIG. 7 Is 2 exploded, perspective view from both the bottom and top comprised of the main body 17, backup disk 18, art disk 19, lens 20 and a 21 point crown bottle cap 23.

Figure 8:
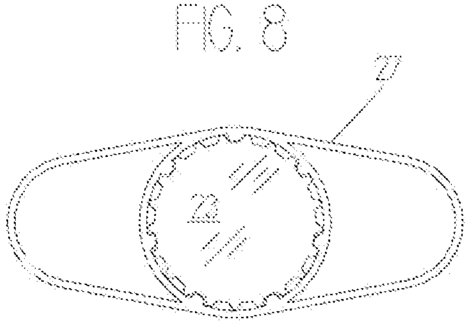
FIG. 8 is a bottom view of prior art U.S. Pat. No. 4,337,678A illustrating the compatibility of the device and a 21 point crown cap.

FIG. 8 is a bottom view of prior art U.S. Pat. No. 4,337,678A illustrating the device 27 and its compatibility with a 21 point crown cap 23.

Figure 9:
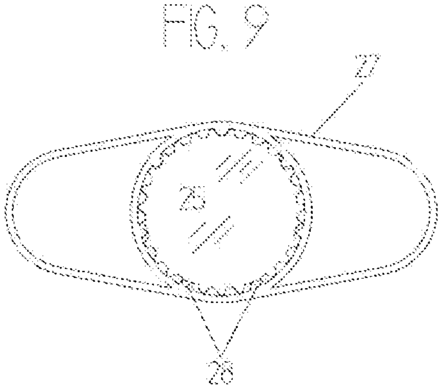
FIG. 9 is a bottom view of prior art U.S. Pat. No. 4,337,678A illustrating the incompatibility of the device and a 27 point crown cap.

FIG. 9 is a bottom view of prior art U.S. Pat. No. 4,337,678A illustrating the device 27 and its incompatibility 28 with a 27 point crown cap 25.

Figure 10:
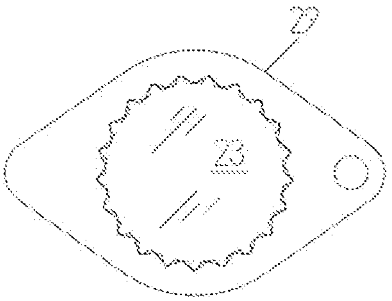
FIG. 10 is a bottom view of prior art U.S. Pat. No. 6,666,110B1 illustrating the compatibility of the device and a 21 point crown cap.

FIG. 10 is a bottom view of prior art U.S. Pat. No. 6,666,110B1 illustrating the device 29 and its compatibility with a 21 point crown cap 23.

Figure 11:
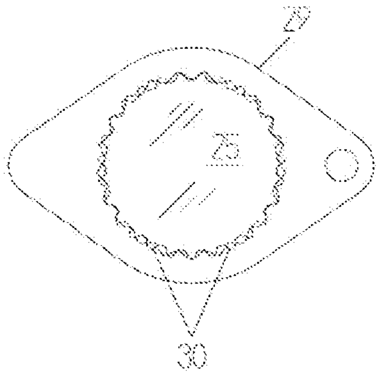
FIG. 11 is a bottom view of prior art U.S. Pat. No. 6,666,110B1 illustrating the incompatibility of the device and a 27 point crown cap.

FIG. 11 is a bottom view of prior art U.S. Pat. No. 6,666,110B1 illustrating the device 29 and its incompatibility 30 with a 27 point crown cap 25.

The invention claimed is:

1. A device to remove twist-off crown bottle caps comprising:

(a) a cylindrical main body with a centered, circular through hole creating inner and outer surfaces; and having a plurality of peripherally spaced vertical ribs comprised within a single row on said inner surface; and respectively adapted to engage vertical grooves of twist-off crown bottle caps; and a circular groove extending down from a top of said main body and positioned midway between said inner and outer surfaces;

(b) a circular and transparent lens comprising a disk and circular wall extending down from an outer edge of the disk; wherein the circular wall is removably received in the circular groove in the top of said main body;

(c) a circular backup disk smaller in diameter than the inner surface of the circular wall; and (d) a circular art disk configured to display art, wherein said art disk has a diameter that is no larger than a diameter of said backup disk;

(e) the backup disk disposed on the top of said main body over the circular though hole, the art disk is disposed over the backup disk, and the circular lens is removably mounted over the backup disk and art disk with the circular wall being inserted into the circular groove.

2. The device to remove twist-off crown bottle caps of claim 1; wherein the circular wall is received in the circular groove by friction fit.

* * * * *